UNITED STATES PATENT OFFICE.

JOSEPH WILLIAMS, JR., OF PITTSBURG, PENNSYLVANIA.

BOILER-CLEANSING COMPOUND.

No. 821,844.     Specification of Letters Patent.     Patented May 29, 1906.

Application filed August 19, 1905. Serial No. 274,869.

*To all whom it may concern:*

Be it known that I, JOSEPH WILLIAMS, Jr., a citizen of the United States, residing at Pittsburg, in the county of Allegheny and State of Pennsylvania, have invented certain new and useful Improvements in Boiler-Cleansing Compounds, of which the following is a specification.

My invention refers to improvements in compositions for the purpose of cleaning boilers or boiler-tubes; and it consists of a fluid mixture composed of certain igredients hereinafter referred to, which mixture is charged into or impregnated with the water contents of the boiler. Its action is to neutralize any acid in the boiler-water and to disintegrate and precipitate the scale formed from the lime and other impurities usually found in water in a greater or less extent. The compound operates by chemical reaction.

The following is a list of ingredients employed in my improved boiler-cleansing compound in the proportions in which the different ingredients are used, it being understood that the amounts given approximate the proportionate fractions of any given unit and that they may be increased or reduced in proportion according to the volume required: water, nine (9) gallons; caustic soda, ten (10) pounds; saltpeter, one-half ($\frac{1}{2}$) pound; soda-ash, three-quarters ($\frac{3}{4}$) pound; sal-soda, one and one-quarter ($1\frac{1}{4}$) pounds. All of these ingredients are charged into the water, wherein they are dissolved, preferably by the process of boiling to a degree not exceeding 210°, until all of the ingredients are dissolved and thoroughly mixed with the water, in which they will thereafter remain in suspension without precipitation.

In applying the mixture or compound a sufficient amount is charged into the water, dependent upon the quality or condition of the water of the boiler itself, in which it will become diffused. In the circulation throughout the boiler or its tubes the treated water will be freed from the lime and other deposits, while any such deposits or scale adhering to the interior of the boiler will be precipitated and may be readily removed.

I do not desire to be limited to the exact proportions given above, as good results may be secured by varying the proportions or amounts within certain limits, and it will be understood that such changes or variations may be made by the chemist or others to suit the local conditions.

Having described my invention, what I claim is—

The herein-described boiler-cleansing compound consisting of a mixture of water, caustic soda, saltpeter, soda-ash and sal-soda in the proportions given, substantially as set forth.

In testimony whereof I affix my signature in presence of two witnesses.

JOSEPH WILLIAMS, JR.

Witnesses:
  C. M. CLARKE,
  E. R. RODD.